Nov. 16, 1937.  T. C. CROSSMAN  2,099,421
BRAKE RIGGING
Filed June 13, 1936  2 Sheets-Sheet 1
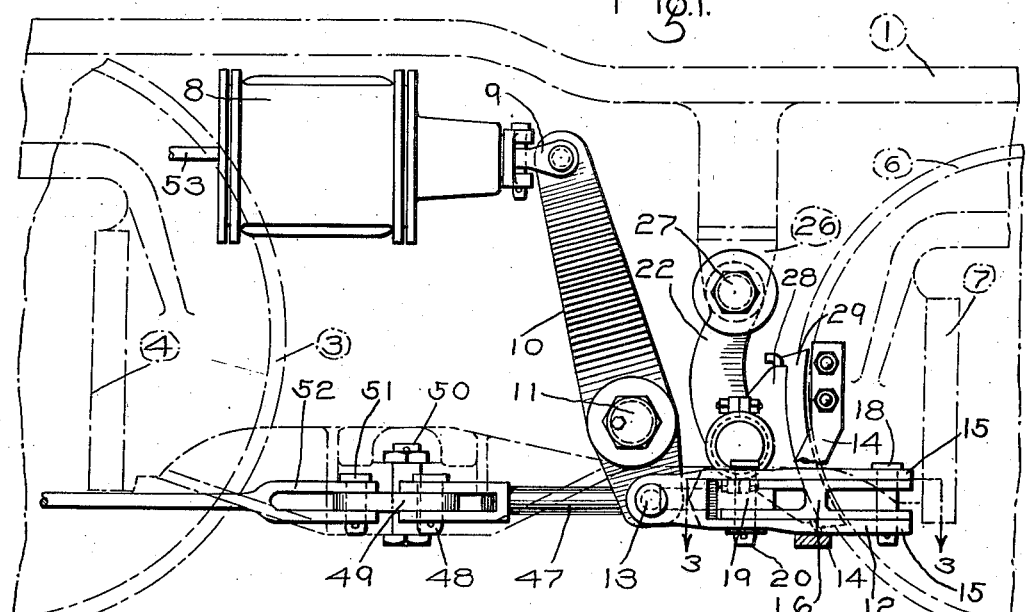
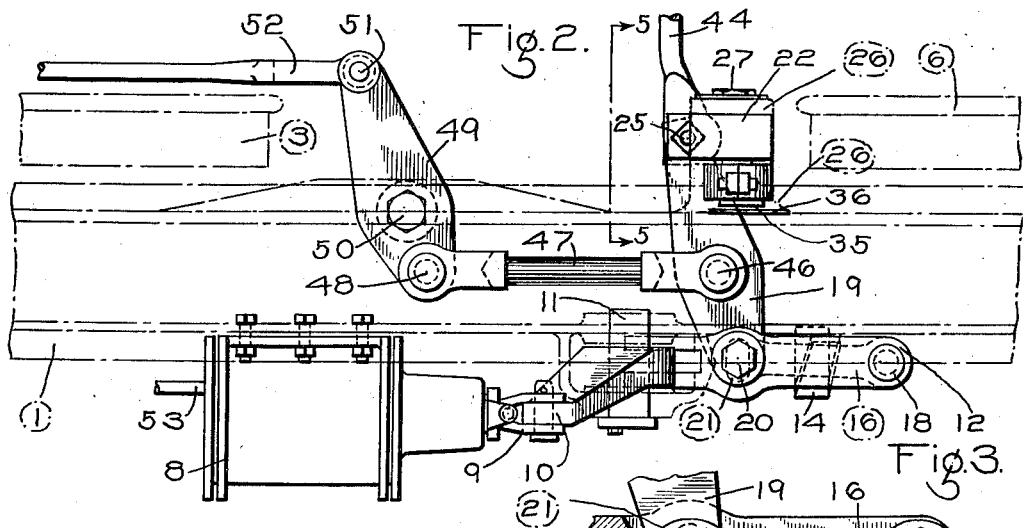
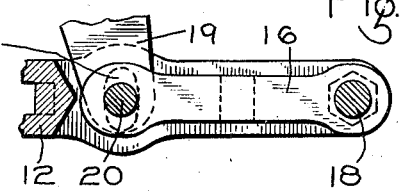
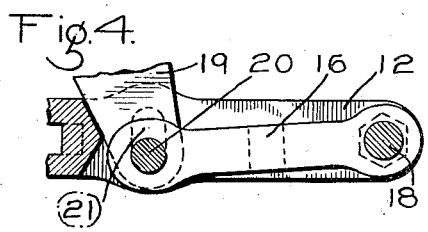
INVENTOR.
THEODORE C. CROSSMAN
BY
Wm. M. Cady
ATTORNEY.

Nov. 16, 1937. T. C. CROSSMAN 2,099,421
BRAKE RIGGING
Filed June 13, 1936 2 Sheets-Sheet 2
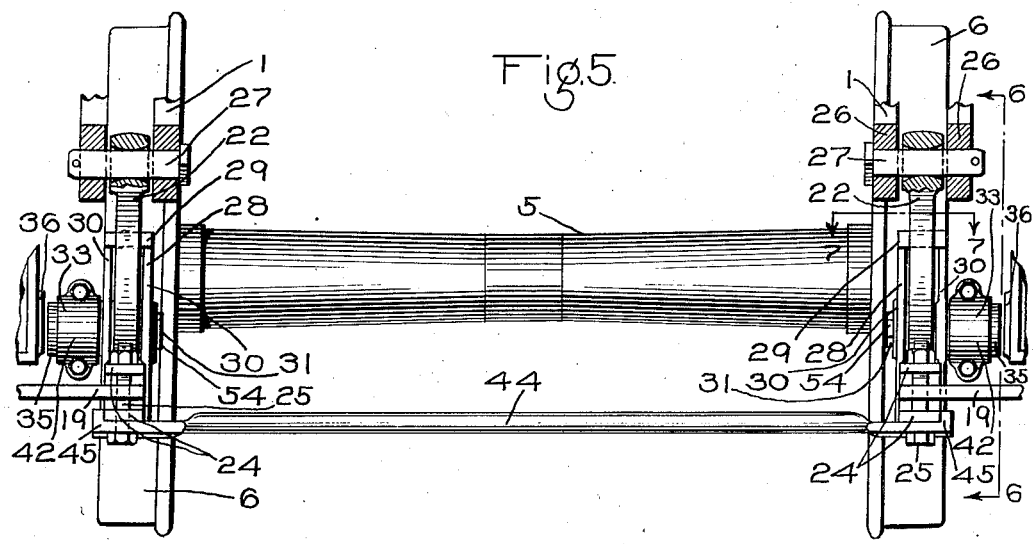
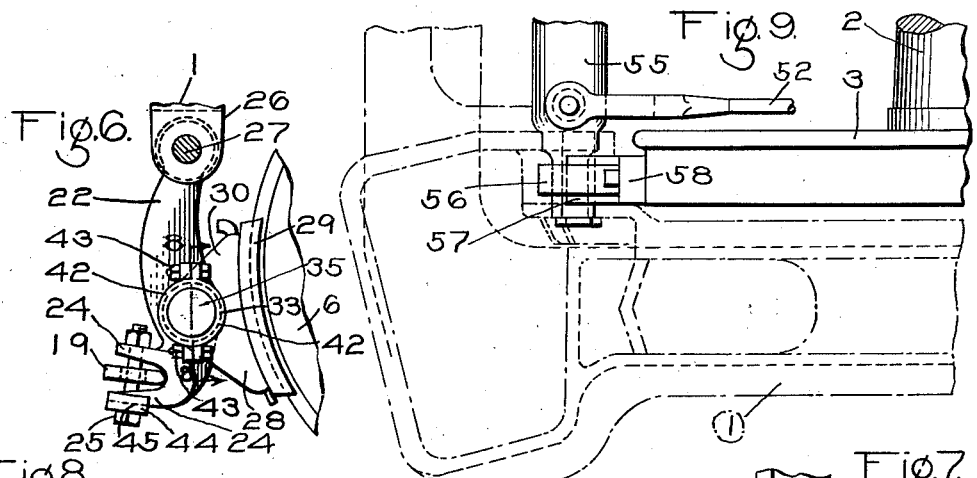
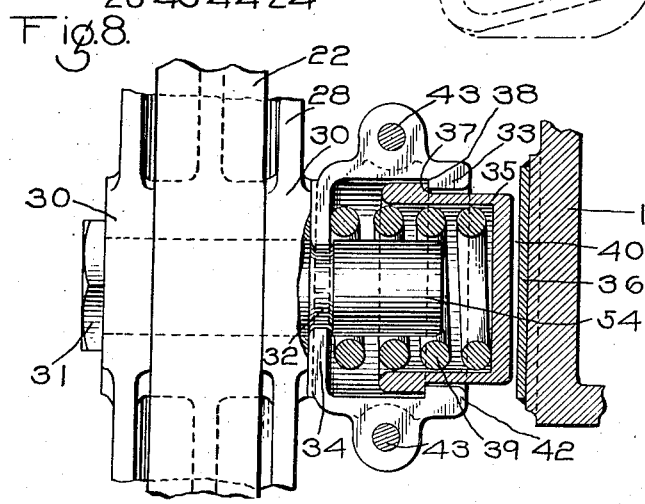
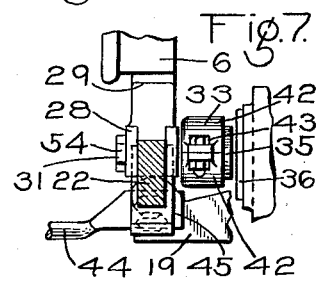
INVENTOR
THEODORE C. CROSSMAN
BY *Wm. M. Cady*
ATTORNEY Patented Nov. 16, 1937

2,099,421

UNITED STATES PATENT OFFICE 2,099,421

BRAKE RIGGING

Theodore C. Crossman, Wilkinsburg, Pa., assignor to The American Brake Company, Wilmerding, Pa., a corporation of Missouri Application June 13, 1936, Serial No. 84,998

20 Claims. (Cl. 188—33)

This invention relates to brake rigging for railway rolling stock and more particularly to locomotive brake riggings which are carried by the locomotive frame or by a truck frame of a locomotive truck such for instance as a trailer truck.

In some types of railway vehicles, such as locomotives, there is, at the present time, a growing tendency toward arranging one or more wheel and axle assemblies thereof for lateral movement with respect to the locomotive frame or to a truck frame as the case may be, so as to permit the wheels to freely follow the track rails on curves or uneven stretches of track without undue side thrust of the wheels on the rails.

With a wheel and axle assembly which is movable laterally as above mentioned, the usual type of brake rigging is objectionable in that it is so rigid laterally of the vehicle that when the brakes are applied and the wheel and axle assembly moves laterally with respect to the frame, said assembly places heavy laterally directed forces on the brake rigging and as a consequence, certain parts of the brake rigging may be damaged or unduly worn. Another objectionable feature is that if, after the brakes have been applied, the assembly is caused to move laterally with the frame, the brake rigging tends to oppose such movement and as a consequence increases the side thrust of the flange of one of the wheels on the rail which results in undue wear of both the rail and rail engaging wheel flange.

The principal object of the present invention is to provide an improved brake rigging which will be free of the above mentioned objectionable features when a wheel and axle assembly with which the rigging is associated moves laterally with respect to a frame such as a locomotive frame or a truck frame.

This object is attained by making that portion of the brake rigging which is directly associated with the laterally movable wheel and axle assembly freely movable laterally with respect to the locomotive or truck frame.

It will be apparent that if the brakes are released while the wheel and axle assembly is in a position at either side of its normal position, that portion of the brake rigging which is movable laterally of the frame by the assembly will have a tendency to remain in the position to which it has been moved even though the assembly should move to its normal centralized position with relation to the frame. From this it is obvious that normally with the vehicle in transit over straight stretches of track, the brake shoe at one side of the assembly might be dragging on the flange of the adjacent wheel, while the brake shoe at the other side of the assembly will overhang the tread of its adjacent wheel. When such a relationship exists between the wheels of the assembly and the brake shoes and an application of the brakes is effected, the entire face of one of the brake shoes is adapted to frictionally engage the tread of an adjacent wheel of the assembly while only a portion of the width of the face of the other brake shoe is adapted to engage the tread of the other wheel of the assembly. This is objectionable for the reason that it results in excessive wear of the overhanging shoe and uneven wear of both shoes with relation to each other.

In order to prevent the above mentioned relationship from occurring it is another object of the invention to provide means adapted to operate automatically when the brakes are released for centralizing the laterally movable portion of the brake rigging with respect to the locomotive or truck frame regardless of the position of the wheel and axle assembly and regardless of the position to which this portion of the rigging has been moved by the assembly.

Due to the very high speed at which locomotives are now being operated there is a growing tendency to apply brake apparatus to the locomotive trailer truck and there is also a tendency toward providing the trailer truck with a wheel and axle assembly which is movable laterally with respect to the frame of the truck so as to permit the wheels of the assembly to freely follow the track rails without undue side thrust of the wheels on the rails. In a four wheel trailer truck the other wheel and axle assembly may be incapable of such lateral movement, although there may be a slight or negligible lateral movement of this assembly due to the usual necessary operating clearances.

A further object of the invention is to provide an improved brake rigging for the above mentioned type of truck which will have a portion capable of movement laterally with respect to the frame of the truck by the laterally movable wheel and axle assembly and having associated with the other wheel and axle assembly a portion which is incapable of such lateral movement with respect to the truck frame and also having an articulated connection between such portions whereby lateral movement of the portion of the brake rigging associated with the laterally movable wheel and axle assembly will not be transmitted to the other wheel and axle assembly.

Other objects and advantages will appear in the following more detailed description of the invention.

In the accompanying drawings, Fig. 1 is a fragmentary side elevational view of a locomotive truck embodying the invention, the truck frame being shown in dot and dash lines to accentuate the showing of the brake rigging; Fig. 2 is a fragmentary plan view of the same; Fig. 3 is a fragmentary detail sectional view of a portion of the brake rigging taken on the line 3—3 of Fig. 1 and illustrates the normal position of certain elements of the rigging; Fig. 4 is a view similar to Fig. 3 but illustrating said certain elements in a different position and Fig. 5 is a fragmentary cross-sectional view of the truck taken on the line 5—5 of Fig. 2 and illustrating the transversely movable wheel and axle assembly, the transversely movable portion of the brake rigging and the automatically operative centralizing means for this portion of the brake rigging, the major portion of the truck frame being omitted to more clearly illustrate certain details of the invention. Fig. 6 is a fragmentary vertical sectional view taken on the line 6—6 of Fig. 5 and illustrates the transversely movable wheel and axle assembly and associated portion of the brake rigging; Fig. 7 is a horizontal sectional view of the same taken on the line 7—7 of Fig. 5, Fig. 8 is an enlarged fragmentary vertical sectional view taken on the line 8—8 of Fig. 6, and Fig. 9 is a fragmentary plan view illustrating the portion of the brake rigging which is associated with a wheel and axle assembly which is fixed against any appreciable lateral movement with respect to the truck frame.

In the drawings the invention is shown in connection with a locomotive four wheel trailer truck which may comprise a frame having spaced longitudinally extending side frames 1 which may be connected together in the usual manner by transversely extending members (not shown).

The truck frame is supported at one end, preferably the rear end, by a wheel and axle assembly which comprises an axle 2 and wheels 3 mounted on the axle in the usual manner. Although not shown each end of the axle 2 is suitably journalled in a journal box which is slidably guided vertically in the usual manner by spaced pedestal jaws 4 with which the adjacent side frame is provided. At each side of the truck the truck frame may be carried, in the usual manner, by a leaf spring (not shown) which may rest on the adjacent journal box. It will here be noted that this wheel and axle assembly is of the usual construction and is not adapted to move any appreciable distance laterally with respect to the truck frame. Due to the usual operating clearances the wheel and axle assembly may at times be moved laterally with respect to the truck frame, but such movement will be so slight that the assembly will at no time strain the brake rigging or interfere with its operation and so far as this invention is concerned the wheel and axle assembly may be considered as fixed against lateral movement.

The truck frame is supported at its other end by a wheel and axle assembly which, as will hereinafter more fully appear, is movable laterally with respect to the truck frame a distance greater than ordinary operating clearances will permit and comprises an axle 5 and wheels 6 mounted on the axle in the usual manner. Although not shown each end of the axle is suitably journalled in a journal box which is guided by spaced pedestal jaws 7 of the side frame to slide both vertically and laterally with respect to the truck frame. At each side of the truck the truck frame may be carried in the usual manner by a leaf spring (not shown) which may rest on the adjacent journal box. It will here be noted that this wheel and axle assembly differs from the other wheel and axle assembly of the truck in that it is movable laterally with respect to the truck frame a distance sufficient to permit the wheels to follow the track rail on curves without causing undue side thrust of the flange of one or the other of the wheels on the adjacent rail.

The brake rigging may comprise two identical sets of operatively connected brake levers and rods which are arranged one set at each side of the longitudinal center line of the truck and may also comprise two brake cylinders 8, each of which is arranged to actuate one of said sets of levers and rods as will hereinafter more fully appear.

Since both sets of brake levers and rods are identical only one set will be described in detail.

The brake cylinder 8 at each side of the truck is arranged outboard of the adjacent truck side frame 1 and is secured thereto in any desired location. In the present embodiment of the invention it is located near the top of the side frame and between the two sets of pedestal jaws of the side frame.

The brake cylinder may be of the usual construction having a cylinder casing in which is mounted the operating piston (not shown) which is adapted to actuate a push rod 9 which projects outwardly beyond the non-pressure head of the casing. The outer end of this push rod is operatively connected to the upper end of a vertically disposed cylinder lever 10 pivotally supported intermediate its ends by a pin 11 carried by the side frame 1. The lower end of the cylinder lever is operatively connected to the inner end of a longitudinally movable pull element or rod 12 by means of a pin 13. The rod 12 is located outboard of the side frame 1 and is supported and slidably guided adjacent its outer end by a hanger 14 rigidly secured to the side frame. The outer end portion of the rod 12 is bifurcated to form jaws 15 which, with the rod positioned as shown, are spaced apart vertically.

Interposed between the jaws 15 of the pull rod 12 and extending longitudinally thereof is a relatively short push link 16 which, at one end, is pivotally connected to the outer ends of the jaws 15 by means of a vertically disposed pin 18, and which, at the other end, is pivotally connected to the outer end of a horizontally disposed transversely extending floating brake lever 19 by means of a vertically disposed pin 20, the ends of said pin 20 extending through accommodating laterally extending arcuate slots 21 provided in the jaws 15. The push link 16 is movable laterally of the pull rod 12 about the pin 20 for reasons which will hereinafter more fully appear.

The inner end of the floating lever 19 operatively engages the lower end portion of a vertically disposed hanger lever 22 within a recess formed by spaced jaws 24 of the lever. This portion of the lever 19 is secured against accidental separation from the hanger lever by means of a pin 25 which extends through registering openings in the jaws 24 and lever 19. The hanger lever is located between the wheels 3 and 6 at one side of the truck and closer to the wheel 6 than to the wheel 3 and longitudinally of the truck is substantially aligned with the wheel 6. The upper end of the hanger lever is pivotally connected to spaced lugs 26 of the side frame 1 by means of a pin 27. The hanger lever intermediate its ends has operatively secured thereto, by means of a pin 54, a brake head 28 which is provided with the usual removable brake shoe 29 for engagement with the tread of the wheel 6.

In the present embodiment of the invention the connection between the hanger lever and the brake head is made by passing the pin 54 through registering openings in the hanger lever and spaced flanges 30 of the brake head which overlie opposite sides of the lever. One end of the pin 54 is provided with a head 31 which engages the inner flange 30 of the brake head to prevent longitudinal movement of the pin in the direction toward the side frame. The other end of the pin extends some distance beyond the outer flange 30 of the brake head and just beyond the brake head is provided with a relatively narrow continuous circular groove 32. Mounted on this portion of the pin is an annular casing 33 having an end wall 34 which is provided with an opening for the reception of the pin 54. The outer surface of the wall abuts the outer surface of the outer flange 30 of the brake head. The edge of the end wall which defines the pin accommodating opening engages the pin 54 within the groove 32 so that the pin is prevented from moving longitudinally in the direction of its head and the casing is prevented from moving in the opposite direction relative to the pin.

As shown in detail in Fig. 8 there is slidably mounted in the casing 33 to move back and forth in the direction of the length of the pin 54 a plunger 35 which extends beyond the outer end of the casing 33, the outer end of the plunger being adapted to engage with a hardened wear plate 36 welded or otherwise secured to the side frame 1. The inner end portion of the plunger is provided with an annular stop shoulder 37 which is adapted to be engaged by an annular stop shoulder 38 located interiorly of the outer end of the casing 33 and formed integral with the casing.

Contained in the casing 33 is a coil spring 39 which surrounds the outer end portion of the pin 54 and which is interposed between and operatively engages the wall 34 of the casing and the plunger 35, which spring, at all times, tends to move the plunger outwardly with respect to the casing 33. With the brake rigging in its normal position the spring 39 maintains the plunger 35 in the position in which it is shown in Figs. 2, 5, 7, and 8 in which position the stop shoulder 38 of the casing engages the stop shoulder 37 of the plunger, such engagement limiting the outward movement of the plunger with respect to the casing. Normally there is a slight clearance space 40 between the outer end of the plunger 35 and the wear plate 36 which is provided for the purpose of preventing undue wear of either the plunger or plate or both.

In the present embodiment of the invention the casing 33 is made of two half sections 42 which are clamped together and to the pin 54 by means of bolts 43. By reason of this construction the interlocking of the casing with the pin 54 and with the plunger 35 is facilitated.

Extending laterally of the truck is a connecting bar 44 which has each of its end portions secured to the lower jaw 24 of the hanger lever 22 by the pin 25. Each end of the bar is provided with a narrow end flange 45 which engages the outer side edge of the lower jaw 24 of the adjacent hanger lever 22. These flanges due to their engagement with the hanger lever relieve the pins 25 of transverse shearing stresses to which the pins are liable to be subjected.

The floating lever 19, intermediate its ends, is pivotally connected, by means of a pin 46, to one end of a longitudinally extending push rod 47. The other end of the push rod is pivotally connected by means of a pin 48 to the outer end of a horizontally disposed laterally extending live brake lever 49 which is pivotally connected intermediate its ends to the side frame by means of a pin 50, said pin preventing the lever 49 from moving laterally with respect to the side frame.

The inner end of the live lever 49 extends beyond the plane of the wheel 3 and has pivotally connected thereto, by means of a pin 51, one end of a longitudinally extending pull rod 52. The other end of the pull rod is operatively connected in the usual manner to a brake beam 55 which extends laterally of the truck and which at its ends is supported from the truck frame by suitable hangers 56 and carries brake heads 57 and shoes 58 for engagement with the wheels 3, all of which may be of the usual construction which is well known.

In operation, assuming the laterally movable wheel and axle assembly to be in its central position with respect to the truck frame as shown in the drawings and fluid under pressure is supplied in the usual manner to effect an application of the brakes.

Fluid under pressure thus supplied flows through a conduit 53 to the brake cylinders 8 causing the brake cylinders and thereby the push rods 9 to operate to rotate each cylinder lever 10 in a clockwise direction about the pin 11. Each lever as it is thus moved causes the pull rod 12, which is connected to the lower end thereof, to move longitudinally in the direction toward the transverse center line of the truck. The push link 16 of course moves longitudinally with the pull rod and as a result causes the floating lever 19 to operate to move the hanger lever 22, brake head 28, and brake shoe 29 toward the tread of the adjacent wheel 6 and at the same time to move the push rod 47 longitudinally in the direction toward the left hand. The push rod 47 as it is thus moved causes the live lever 49 to rotate in a clockwise direction about the pivot pin 50, causing the pull rod 52 to move longitudinally of the truck in a direction toward the right hand. The pull rod 52 at each side of the truck as it is thus moved, causes the brake beam 55, hanger lever 56, brake head 57 and brake shoes 58 to move toward the treads of the wheels 3. It will thus be seen that when fluid under pressure is supplied to the brake cylinders 8 the brake rigging operates to cause the brake shoes 58 and 28 to move into braking engagement with the wheels 3 and 6, respectively.

If, while the brake shoes are in engagement with the wheels 3 and 6, the wheels 6 and axle 5 should move laterally with respect to the truck frame and consequently to the axle 2 and wheels 3, the brake shoes 29, brake heads 28, hanger levers 22 connecting bar 44, floating levers 19 and push links 16 will, due to the engagement of the brake shoes with the wheels 6, move with the wheels laterally with respect to the truck frame.

Assuming that the lateral movement of the wheels 6 and axle 5 is toward the right hand side of the truck as viewed in Fig. 5 the hanger levers 22 will be rocked on their supporting pins 27 in the same direction, and plunger 35 on the pin 54, at the right hand side of the truck, will engage the adjacent wear plate 36 while the corresponding plunger at the other side of the truck will be moved further away from its adjacent wear plate 36.

If the lateral movement of the hanger lever is continued after plunger 35 is brought to a stop by the engagement of the wear plate 36 therewith, the spring 39, due to the continued movement of the casing 33 toward the right hand, will compress the associated spring 39. The distance between the outer end surface of the casing 33 and the wear plate is slightly greater than the maximum distance the wheel and axle assembly is movable laterally with respect to the truck frame, so that the casing will not engage the wear plate for the reason that its lateral movement will be limited by the wheel and axle assembly.

As the floating levers 19 are moved laterally of the truck the end of the push link 16 which is connected with the outer end of the lever 19 at the right hand side of the truck is caused to swing outwardly about the pin 18 relative to the adjacent pull rod 12 from its normal position as shown in Fig. 3 to its outer position as shown in Fig. 4 if the wheel and axle assembly has moved its maximum distance laterally with respect to the truck frame. It will be noted from an inspection of Fig. 4 that when the wheel and axle assembly is in its extreme position to the right the pin 20 will not engage the ends of the slots 21 in the pull rod 12 and by reason of this the lateral movement of the wheel and axle assembly relative to the truck frame cannot possibly cause lateral strains to be transmitted to the pull rod 12. On the left hand side of the truck the push link 16 moves inwardly and is adapted to assume a position just opposite to that in which it is shown in Fig. 4 as will be understood.

From an inspection of Fig. 2 it will be seen that since each push rod 47 is pivotally connected to the floating lever 19 and live lever 49 at one side of the truck, the floating levers as they are moved laterally relative to the truck frame are not permitted to transmit laterally directed forces to the live lever 49.

If the release of the brakes is effected while the laterally movable wheel and axle assembly is still in its right hand position, the compressed spring 39, at the right hand side of the truck, acts through the medium of the casing 33 to move the brake head 28 and thereby the brake shoe 29 and hanger lever 22 laterally with respect to the truck frame to their normal position. Since the hanger levers 22 at opposite sides of the truck are rigidly connected together by the bar 44, the hanger lever 22, brake head 28 and brake shoe 29 at the left hand side of the truck will be caused to move to their normal position by the action of the spring 39. From this it will be seen that when the wheel and axle assembly is returned to its normal position with respect to the truck frame, each of the brake shoes 29 will be properly aligned with the tread of the wheel which the shoe is adapted to engage.

As the hangers 22 are being returned to their normal positions they cause the floating levers 19 and push rods 16 to move laterally to their normal position as shown in Fig. 2.

If the movement of the laterally movable wheel and axle assembly and associated portions of the brake rigging is toward the left, the spring 39 at the left hand side of the truck will act to return the several parts of the rigging to their normal position upon the release of the brakes in the same manner as when the brakes are released with the wheel and axle assembly in its right hand position.

It will be apparent that if there were no means provided for returning the laterally movable parts of the brake rigging to their normal position, such parts might in some instances when moved laterally by the laterally movable wheel and axle assembly remain in the position to which they have been moved even though the wheel and axle assembly may be in its normal position with respect to the truck frame. This would be very objectionable in that while the brake shoe at one side of the truck would be adapted to fully engage the tread of an adjacent wheel the brake shoe at the other side of the truck would, for only a portion of its width, be adapted to engage the tread of its adjacent wheel and the remainder of the shoe would overhang the tread of the wheel. This would cause uneven wear of the brake shoes and excessive wear of the shoe which engages the wheel for a portion of its width only.

From the foregoing description it will be seen that I have provided a brake rigging for a truck having a relatively fixed wheel and axle assembly and a wheel and axle assembly which is movable laterally relative to the truck frame, which brake rigging embodies braking elements which are so associated with the laterally movable wheel and axle assembly as to be freely movable laterally of the truck frame with the assembly and embodies means for moving said associated brake elements relative to both the truck frame and laterally movable wheel and axle assembly to their normal position with respect to the truck frame when with the elements held out of their normal position by the wheel and axle assembly a release of the brakes is effected, and further embodies means whereby lateral strains will not be transmitted to the brake elements associated with the relatively fixed wheel and axle assembly upon lateral movement of the brake elements associated with the laterally movable wheel and axle assembly.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a railway vehicle, in combination, a frame, a wheel and axle assembly arranged for lateral movement relative to said frame and having a braking surface movable therewith, a brake element carried by said frame and being movable into and out of braking engagement with said braking surface, means permitting lateral movement of said element from a normal position with said assembly when the element is in engagement with said braking surface, and means for moving said element from an abnormal lateral position to its normal position upon movement of said element out of braking engagement with said braking surface.

2. In a railway vehicle, in combination, a frame, a wheel and axle assembly arranged for lateral movement relative to said frame and having a braking surface movable therewith, a brake element carried by said frame and being movable into and out of braking engagement with said braking surface, means permitting lateral movement of said element from a normal position with said assembly when the element is in engagement with said braking surface, and means urging said element to its normal position independently of lateral movement of the wheel and axle assembly when said element is moved out of engagement with said braking surface.

3. In a railway vehicle, in combination, a frame, a wheel and axle assembly arranged for lateral movement relative to said frame and having a braking surface movable therewith, a brake hanger lever pivotally carried by said frame, a brake element pivotally connected to said brake hanger lever and being movable into and out of braking engagement with said braking surface, means permitting lateral movement of said hanger and thereby said element from a normal position with said assembly when the element is in engagement with said braking surface, and means located in axial alignment with the pivotal connection between said brake hanger lever adapted to cooperate with said frame and element upon movement of the element from its normal position to tend to return the element to its normal position.

4. In a railway vehicle, in combination, a frame, a wheel and axle assembly arranged for lateral movement relative to said frame and having a braking surface movable therewith, a brake element carried by said frame and being movable into and out of braking engagement with said braking surface, means permitting lateral movement of said element from a normal position with said assembly when the element is in engagement with said braking surface, and means for moving said element relative to said frame and assembly from an abnormal lateral position to its normal position upon movement of said element out of braking engagement with said braking surface.

5. In a railway vehicle, in combination, a frame, a wheel and axle assembly arranged for lateral movement relative to said frame and having a braking surface movable therewith, a brake element carried by said frame and being movable into and out of braking engagement with said braking surface, means permitting lateral movement of said element from a normal position with said assembly when the element is in engagement with said braking surface, and means interposed between said frame and element operative to return said element to its normal position independently of the movement of the wheel and axle assembly when the brake element is moved out of braking engagement with said braking surface.

6. In a railway vehicle, in combination, a frame, a wheel and axle assembly arranged for lateral movement relative to said frame and having a braking surface movable therewith, a brake element carried by said frame and being movable into and out of braking engagement with said braking surface, means permitting lateral movement of said element from a normal position with said assembly when the element is in engagement with said braking surface, and means carried by said element and cooperating with said frame for moving said element from an abnormal lateral position to its normal position upon movement of said element out of braking engagement with said braking surface.

7. In a railway vehicle, in combination, a frame, a wheel and axle assembly arranged for lateral movement relative to said frame and having a braking surface movable therewith, a brake element carried by said frame and being movable into and out of braking engagement with said braking surface, means permitting lateral movement of said element from a normal position with said assembly when the element is in engagement with said braking surface, and spring means adapted to be conditioned when said element is moved laterally from its normal position to an abnormal position for moving the element from said abnormal position to its normal position upon movement of the element out of braking engagement with said braking surface.

8. In a railway vehicle, in combination, a frame, a wheel and axle assembly arranged for lateral movement relative to said frame and having two braking surfaces movable therewith, a pair of brake elements carried by said frame and being movable laterally relative to said frame by said assembly, each of said elements being movable into and out of braking engagement with the adjacent braking surface, a member rigidly tying said elements together laterally of the frame, and means associated with one of said elements adapted to cooperate with said frame to move said element and bar and thereby the other of said elements laterally relative to said frame to their normal position with respect to the frame when the elements are in a position other than said normal position and are moved out of braking engagement with said braking surfaces.

9. In a railway vehicle, in combination, a frame, a wheel and axle assembly arranged for lateral movement relative to said frame and having a braking surface movable therewith, a brake element carried by said frame adapted to be moved into and out of braking engagement with said braking surface and being arranged for lateral movement relative to said frame by said assembly, a wheel and axle assembly substantially fixed against lateral movement with respect to said frame and having a braking surface, a brake element carried by said frame adapted to be moved into and out of braking engagement with the second mentioned braking surface, a system of operatively connected rods and levers for actuating both of said elements, and a brake cylinder for actuating said system of levers and rods, said system being articulated between said elements to prevent the laterally movable element as it moves laterally relative to the frame from transmitting lateral strains to said system.

10. In a railway vehicle, in combination, a frame, a wheel and axle assembly arranged for lateral movement relative to said frame and having a braking surface movable therewith, a brake element carried by said frame adapted to be moved into and out of braking engagement with said braking surface and being arranged for lateral movement relative to said frame by said assembly, a floating lever for actuating said element and arranged to move laterally with said element relative to said frame, a wheel and axle assembly substantially fixed against lateral movement with respect to said frame and having a braking surface, a brake element adapted to be moved into and out of braking engagement with the last mentioned braking surface, a live lever pivotally carried on said frame and articulately connected to said floating lever to permit lateral movement of the floating lever relative to said live lever, said live lever being operative by said floating lever to actuate the last mentioned brake element, and means for actuating said floating lever.

11. In a railway vehicle, in combination, a frame, a wheel and axle assembly arranged for lateral movement relative to said frame and having a braking surface movable therewith, a brake element carried by said frame adapted to be moved into and out of braking engagement with said braking surface and being arranged for lateral movement relative to said frame by said assembly, a wheel and axle assembly substantially fixed against lateral movement with respect to said frame and having a braking surface, a brake element carried by said frame adapted to be moved into and out of braking engagement with the second mentioned braking surface, a system of operatively connected rods and levers for actuating both of said elements, and a brake cylinder for actuating said system of levers and rods, said system being articulated between said elements to prevent the laterally movable element as it moves laterally relative to the frame from transmitting lateral strains to said system, said system comprising a floating lever for actuating said element, a pull rod, a link operatively connecting said pull rod and floating lever, said link being pivotally connected at one end to the floating lever and being pivotally connected at the other end to said pull rod to permit the link to swing laterally with respect to the pull rod, and means for actuating said pull rod.

12. In a railway vehicle, in combination, a frame, a wheel and axle assembly arranged for lateral movement relative to said frame and having a braking surface movable therewith, a brake element carried by said frame adapted to be moved into and out of braking engagement with said braking surface and being arranged for lateral movement relative to said frame by said assembly, a wheel and axle assembly substantially fixed against lateral movement with respect to said frame and having a braking surface, a brake element carried by said frame adapted to be moved into and out of braking engagement with the second mentioned braking surface, a system of operatively connected rods and levers for actuating both of said elements, and a brake cylinder for actuating said system of levers and rods, said system being articulated between said elements to prevent the laterally movable element as it moves laterally relative to the frame from transmitting lateral strains to said system, said system comprising a floating lever for actuating said element, an operating rod, a member pivotally connected to said operating rod to swing laterally relative thereto and operatively connected to said floating lever, and means for actuating said rod.

13. In a railway vehicle, in combination, a frame, a wheel and axle assembly arranged for lateral movement relative to said frame and having a braking surface movable therewith, a brake element carried by said frame and being movable into and out of braking engagement with said braking surface, a lever for actuating said element and arranged for lateral movement with the element, an operating rod, means operatively connecting said rod and lever and arranged to permit the lever to move laterally with respect to the rod, and means for actuating said rod.

14. In a railway vehicle, in combination, a frame, a wheel and axle assembly arranged for lateral movement relative to said frame and having a braking surface movable therewith, a brake element carried by said frame and being movable into and out of braking engagement with said braking surface, a brake rod, a lever for actuating said element and arranged for lateral movement relative to said frame and rod, means operatively connecting said rod and lever, and means for actuating said rod.

15. In a railway vehicle, in combination, a frame, a wheel and axle assembly arranged for lateral movement relative to said frame and having a braking surface movable therewith, a brake element carried by said frame and being movable into and out of braking engagement with said braking surface, a brake rod, a lever for actuating said element arranged for lateral movement relative to said frame and rod and being articulately connected to the rod, and means for actuating said rod and thereby said lever.

16. In a railway vehicle, in combination, a frame, a wheel and axle assembly arranged for lateral movement relative to said frame and having a braking surface movable therewith, a brake element carried by said frame and being movable into and out of braking engagement with said braking surface, a pull rod, a lever for actuating said element and arranged for lateral movement by said element relative to said frame and rod, a push link adapted to be operated by said rod to actuate said lever and means for actuating said rod.

17. In a railway vehicle, in combination, a frame, a wheel and axle assembly arranged for lateral movement relative to said frame and having a braking surface movable therewith, a brake element carried by said frame and being movable into and out of braking engagement with said braking surface, a longitudinally movable brake rod supported by said frame, a lever for actuating said element and arranged for lateral movement by said element relative to said frame and rod, a link supported by said rod operatively connecting the rod and lever, and means for actuating said rod.

18. In a railway vehicle, in combination, a frame, a wheel and axle assembly arranged for lateral movement relative to said frame and having a braking surface movable therewith, a brake element carried by said frame and being movable into and out of braking engagement with said braking surface, a longitudinally movable brake rod supported by said frame, a lever for actuating said element and arranged for lateral movement by said element relative to said frame and rod, a link carried by said rod and operatively connecting said rod and lever, said link being arranged to swing laterally with said lever relative to the rod, and means for actuating said rod.

19. In a railway vehicle, in combination, a frame, a wheel and axle assembly arranged for lateral movement relative to said frame and having a braking surface movable therewith, a brake element carried by said frame and being movable into and out of braking engagement with said braking surface, a longitudinally movable brake rod supported by said frame, a lever for actuating said element and arranged for lateral movement by said element relative to said frame and rod, a link carried by said rod and operatively connecting said rod and lever, said link being arranged wholly within said rod and being pivotally connected to the rod to swing laterally with the lever relative to said rod, and means for actuating said rod.

20. In a railway vehicle, in combination, a frame, a wheel and axle assembly arranged for lateral movement relative to said frame and having a braking surface movable therewith, a brake element carried by said frame and being movable into and out of braking engagement with said braking surface, a longitudinally movable brake rod supported by said frame, a lever for actuating said element and arranged for lateral movement by said element relative to said frame and rod, a link supported by said rod and operatively connecting said rod and lever in the plane of said rod, said link being pivotally connected to the rod to swing laterally with the lever relative to said rod, a brake cylinder lever pivotally carried by said frame for actuating said rod, and a brake cylinder for actuating said brake cylinder lever.

THEODORE C. CROSSMAN.